United States Patent [19]

Iehisa et al.

[11] Patent Number: 5,136,606
[45] Date of Patent: Aug. 4, 1992

[54] DISCHARGE TUBE FOR A GAS LASER DEVICE

[75] Inventors: Nobuaki Iehisa, Minamitsuru; Etsuo Yamazaki, Hachioji, both of Japan

[73] Assignee: Fanuc Ltd., Minamitsuru, Japan

[21] Appl. No.: 439,023

[22] PCT Filed: Mar. 16, 1989

[86] PCT No.: PCT/JP89/00287
§ 371 Date: Oct. 2, 1990
§ 102(e) Date: Oct. 2, 1990

[87] PCT Pub. No.: WO89/10017
PCT Pub. Date: Oct. 19, 1989

[30] Foreign Application Priority Data

Apr. 8, 1988 [JP] Japan ............................. 63-086547

[51] Int. Cl.$^5$ ............................................. H01S 3/03
[52] U.S. Cl. ........................................ 372/61; 372/87; 372/88

[58] Field of Search ............................. 372/61, 87, 88

[56] References Cited

U.S. PATENT DOCUMENTS

| | | | |
|---|---|---|---|
| 4,359,777 | 11/1982 | Fox et al. | 372/61 |
| 4,464,760 | 8/1984 | Sutter, Jr. | 372/61 |
| 4,800,567 | 1/1989 | Karube | 372/87 |
| 4,885,754 | 12/1989 | Egawa | 372/86 |
| 4,964,136 | 10/1990 | Egawa | 372/61 |

Primary Examiner—Leon Scott, Jr.
Attorney, Agent, or Firm—Staas & Halsey

[57] ABSTRACT

A discharge tube for a high-speed axial-flow type discharge pumping gas laser device is provided, in which a capacitive load medium (9) under metal electrodes (2a, 2b) has convexly curved faces opposed to each other and constitutes a discharge tube. With this construction, the distribution of a laser oscillation gain within the discharge tube (1) is made uniform, and a single-mode laser beam is obtained.

5 Claims, 4 Drawing Sheets

DISCHARGE TUBE FOR A GAS LASER DEVICE

TECHNICAL FIELD

The present invention relates to a discharge tube for a high-speed axial-flow type discharge pumping gas laser device utilizing a high-frequency discharge, and more particularly, to a configuration of an electrode portion of a discharge tube.

BACKGROUND ART

FIG. 3 is a conceptual diagram illustrating a configuration of electrodes of a cylindrical discharge tube according to the prior art, wherein 1 denotes a discharge tube, and 2a and 2b denote metal electrodes arranged along the outer periphery of the tubular wall of the discharge tube 1 and utilizing the tubular wall as a capacitive load. A high-frequency electric power of 2 MHz is supplied from a high-frequency, power supply 3, provided outside the discharge tube 1, through the electrodes to a laser gas flow 4 passing through the interior of the discharge tube 1 at a high speed. Numeral 5a schematically illustrates a transverse mode of the laser beam produced by this discharge pumping means. This transverse mode is a multimode, as explained hereinafter.

Optical elements and other elements necessary for a laser oscillator to produce a laser beam are omitted from FIG. 3.

FIG. 4 is a sectional view of the discharge tube in FIG. 3. As will be understood from FIG. 4, because the electrodes 2a and 2b are arranged on the outer periphery of the discharge tube 1, the closer they are to the tubular wall of the discharge tube away from the center thereof, the shorter the discharging distance between the opposed electrodes 2a and 2b, and thus the electric field is concentrated at the side edges of the electrodes 2a and 2b. Accordingly, a discharge current is liable to be concentrated at both ends of the discharge tube 1 and thus the current density per unit volume is large.

The distribution of the electric field strength is indicated by electric lines of force 6, and the laser active region is indicated at 7 in FIG. 4.

According to the prior art, the laser oscillation gain is lower at the center of the discharge tube than at the outer portions thereof, and thus a single-mode laser beam usable for a laser machining operation cannot be obtained. Accordingly, a multimode transverse mode of the laser beam is used, as indicated at 5a in FIG. 3.

DISCLOSURE OF THE INVENTION

The present invention has been created in view of the above circumstances, and an object thereof is to provide a discharge tube for a gas laser device by which the distribution of a current density, and thus a laser oscillation gain within a discharge tube, is made uniform to obtain a single mode laser beam able to be used for a laser machining operation.

To achieve the above object, according to the present invention, there is provided a discharge tube for a high-speed axial-flow type discharge pumping gas laser device in which the axis of a laser gas flow and the axis of a laser oscillation are in alignment and are perpendicular to the direction of discharge for high-frequency discharge pumping, the discharge tube being characterized in that a capacitive load medium under metal electrodes has convexly curved faces opposed to each other and constitutes a discharge tube.

Since the capacitive load medium under the metal electrodes has convex faces, the discharge current and the distribution of the oscillation gain are made uniform, whereby a single-mode laser beam can be obtained.

BEST MODE OF CARRYING OUT THE INVENTION

An embodiment of the present invention will be described with reference to the drawings.

Figure 1:
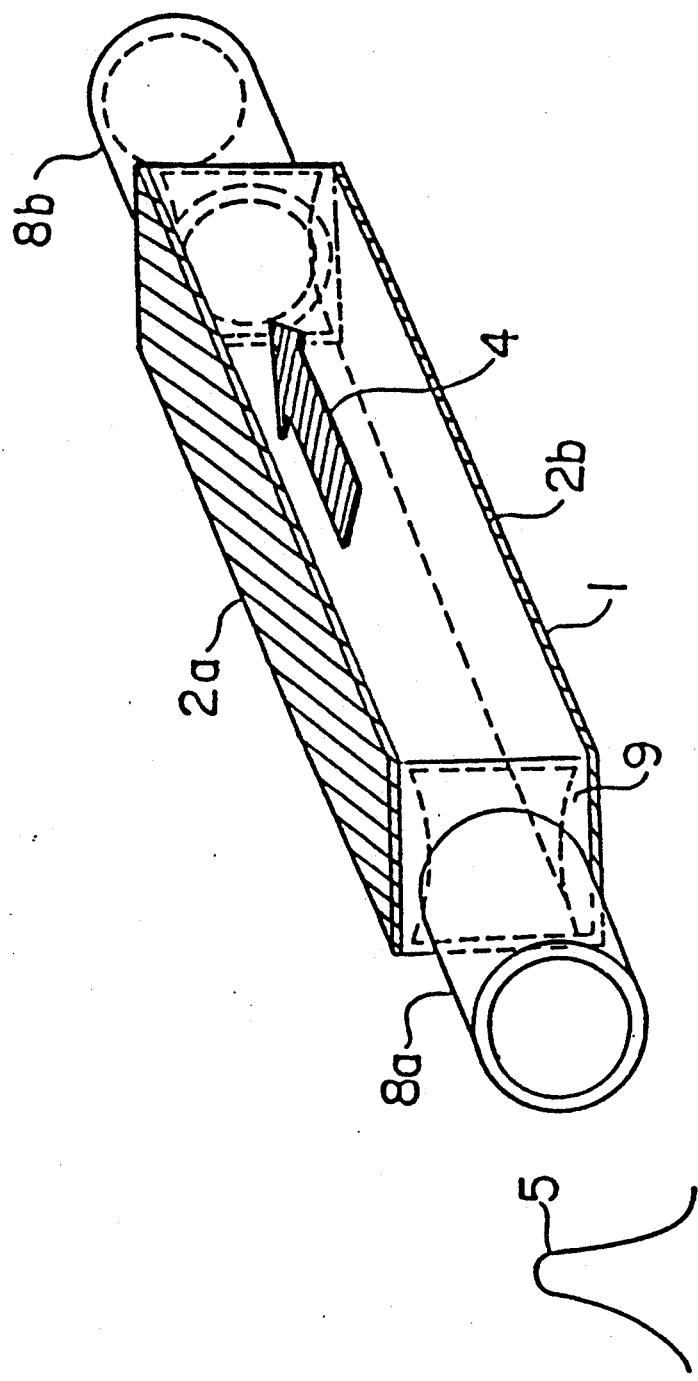
FIG. 1 is a perspective view of a discharge tube for a gas laser device according to an embodiment of the present invention.

FIG. 1 is a perspective view of a discharge tube for a gas laser device according to an embodiment of the invention, wherein 1 denotes a discharge tube, and 2a and 2b denote metal electrodes made of copper, aluminum, or the like. The electrodes 2a and 2b are bonded to the outer wall of the discharge tube 1 by silver paste or the like, and are further secured by a band or the like, not shown.

Numeral 4 denotes a flow of a gas, which is a mixture of $CO_2$, $N_2$, and He. The gas is circulated at a speed of about 100 m/sec by a Roots blower or the like, not shown.

Numeral 9 denotes a capacitive load medium which constitutes the discharge tube and which is formed by fusing quartz and drawing it in a mold. The section of the capacitive load medium 9 will be described in detail later. Numerals 8a and 8b denote flanges for the ends of the discharge tube, having an aperture (restriction) effect for converting the laser beam mode into a circular mode suitable for machining. The flanges are fusion bonded to the capacitive load medium 9.

The aperture of each discharge tube flange is set to a value smaller than the minimum gap between faces 9a and 9b of the capacitive load medium. The flanges are not provided with any electrodes.

A high-frequency electric power of about 2 MHz is supplied to the electrodes from a high-frequency power supply, not shown, provided outside the discharge tube 1, to effect a discharge pumping of the gas flow 4 for the oscillation and amplification of the laser beam.

Optical components such as mirrors are omitted from the figure.

Figure 2:
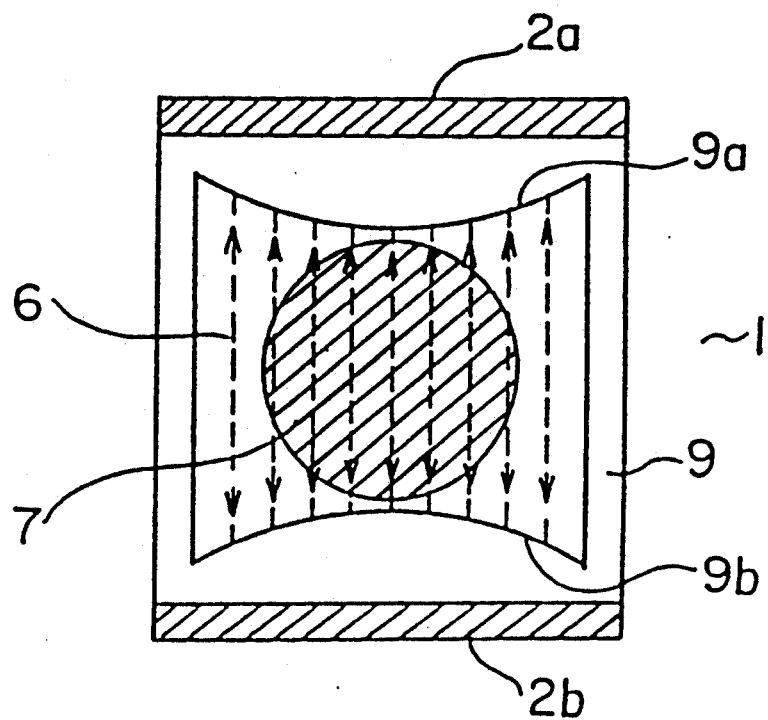
FIG. 2 is a sectional view of the discharge tube shown in FIG. 1.
Figure 3:
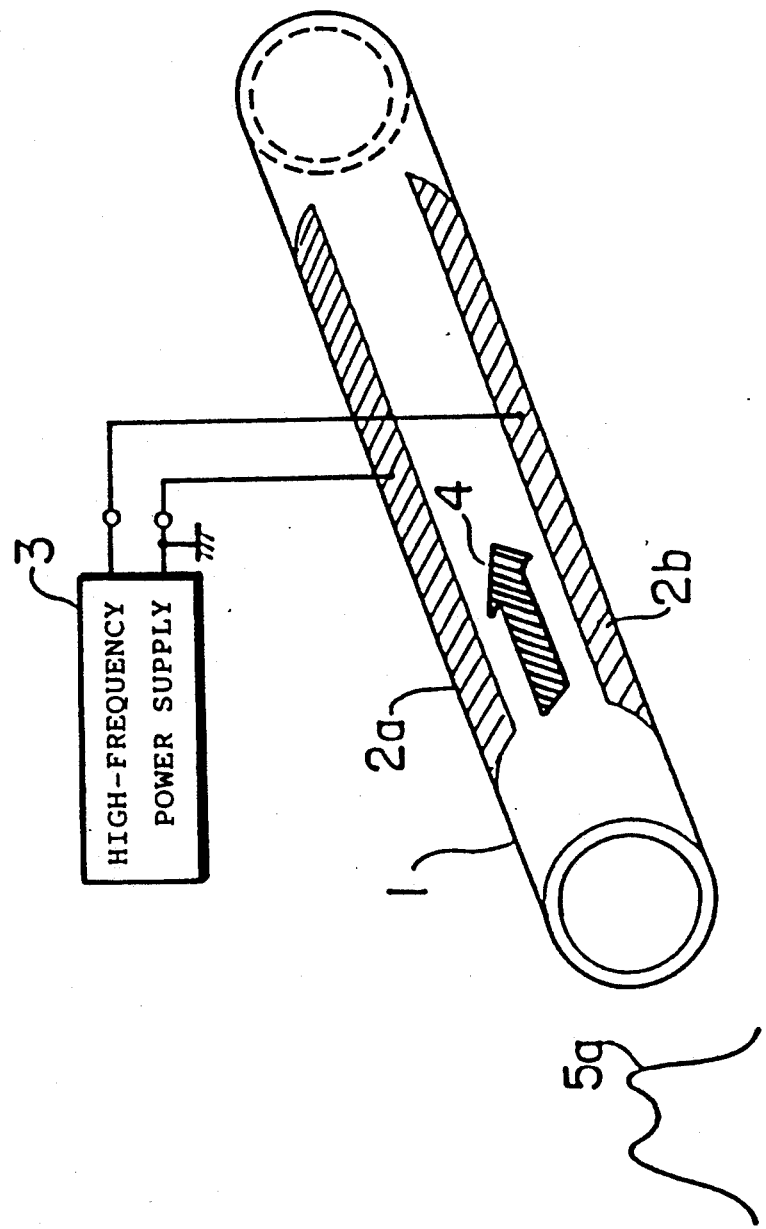
FIG. 3 is a conceptual diagram illustrating a configuration of electrodes of a prior art cylindrical discharge tube.
Figure 4:
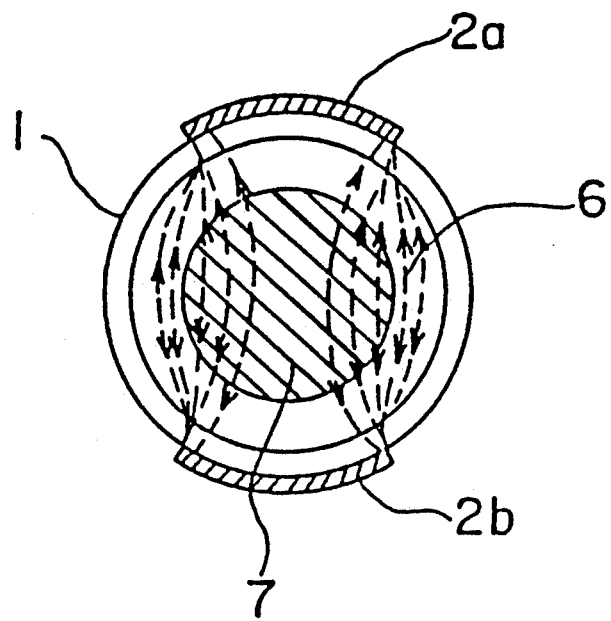
FIG. 4 is a sectional view of the discharge tube shown in FIG. 3.

FIG. 2 is a sectional view of the discharge tube of FIG. 1, wherein 2a and 2b denote the metal electrodes and 9 the capacitive load medium. The sectional view shows that the capacitive load medium 9 preferably has a CHANG type convex shape on the inside thereof whereby the distribution of the electric field strength between the electrodes is made uniform. The upper and lower faces 9a and 9b of the capacitive load medium generally form a hyperbola, and are symmetrical and of the same shape and size. The inside side faces of the capacitive load medium are straight while the configuration of the outside is rectangular.

The electrodes constituted by the metal electrodes 2a and 2b and the capacitive load medium 9 must be positioned diametrically opposite to each other to within ±1 degree.

According to the above construction, the distribution of the electric field strength between the electrodes is made uniform, as indicated by the electric lines of force 6, and the stability and uniformity of the discharging are enhanced. As a result, the laser oscillation gain in the laser active region 7 is made uniform, and has a circular section, as indicated by the hatching in the figure. Accordingly, a single-mode laser beam having a Gaussian distribution can be obtained. In the above description, the capacitive load medium is formed into a CHANG type shape, but similar effects can be obtained with other convex shapes by which a uniform electric field is easily obtained.

As described above, according to the present invention, the capacitive load medium is provided with symmetrical convex faces, whereby the concentration of the electric field strength at the edges of the electrodes of the discharge tube can be restrained, the discharge is stabilized, and the distribution of the current density within the discharge tube is made uniform.

Accordingly, the distribution of the laser oscillation gain within the discharge tube is made uniform, whereby a single-mode laser beam is obtained and thus a satisfactory laser machining can be carried out.

We claim:

1. A discharge tube for a high-speed axialflow type discharge pumping gas laser device in which the axis of a laser gas flow and the axis of a laser oscillation are in alignment and are perpendicular to the direction of discharge for high-frequency discharge pumping, said discharge tube comprising a capacitive load medium under metal electrodes, said capacitive load medium having convexly curved faces opposed to each other and flanges provided at both ends of said discharge tube, each of said flanges having a circular aperture with an inner diameter smaller than a minimum discharge gap to obtain a circular beam mode and whereby said convex faces of said capacitive load medium results in concentration of electric field strength at edges of the electrodes of said discharge tube being restrained such that said discharge tube is stabilized and distribution of current density within said discharge tube is uniform.

2. A discharge tube according to claim 1, wherein said curved faces of said capacitive load medium are symmetrical and of the same shape.

3. A discharge tube for a high-speed axial-flow type discharge pumping gas laser device in which the axis of a laser gas flow and the axis of a laser oscillation are in alignment and are perpendicular to the direction of discharge for high-frequency discharge pumping, said discharge tube comprising:

a capacitive load medium having a hollow interior provided with a pair of opposed, convexly curved faces and a pair of opposed metal electrodes mounted on the exterior of said capacitive load medium, each of said metal electrodes being positioned on the exterior of one of said curved faces whereby said curved faces are between said electrodes; and flanges provided at both ends of said discharge tube, each of said flanges having a circular aperture with an inner diameter smaller than a medium discharge gap to obtain a circular beam mode and whereby convex faces of said capacitive load medium results in concentration of electric field strength at edges of the electrodes of said discharge tube being restrained such that said discharge tube is stabilized and distribution of current density within said discharge tube is uniform.

4. A discharge tube according to claim 3, wherein said curved faces of said capacitive load medium are symmetrical and of the same shape.

5. A discharge tube according to claim 3, wherein said hollow interior is further provided with a pair of opposed flat faces.

* * * * *